United States Patent [19]

Takase et al.

[11] Patent Number: 4,718,949
[45] Date of Patent: Jan. 12, 1988

[54] METHOD OF PRODUCING A CLADDING TUBE FOR REACTOR FUEL

[75] Inventors: Iwao Takase, Toukai; Toshimi Yoshida, Mito; Shinzo Ikeda, Toukai; Isao Masaoka; Junjiro Nakajima, both of Hitachi, all of Japan

[73] Assignee: Hitachi, Ltd., Tokyo, Japan

[21] Appl. No.: 915,555

[22] Filed: Oct. 6, 1986

Related U.S. Application Data

[63] Continuation-in-part of Ser. No. 699,560, Feb. 8, 1985, abandoned.

[30] Foreign Application Priority Data

Feb. 8, 1984 [JP] Japan .................................. 59-19980

[51] Int. Cl.⁴ .............................................. C22F 1/18
[52] U.S. Cl. ............................... 148/11.5 F; 148/133; 376/457
[58] Field of Search .................. 148/11.5 F, 133, 127, 148/12

[56] References Cited

U.S. PATENT DOCUMENTS 4,576,654 3/1986 Edders et al. .................. 148/11.5 F

FOREIGN PATENT DOCUMENTS

3224686 1/1983 Fed. Rep. of Germany .
1525717 9/1978 United Kingdom .

Primary Examiner—Christopher W. Brody
Attorney, Agent, or Firm—Antonelli, Terry & Wands

[57] ABSTRACT

A method of producing cladding tube comprises a step of temperature-gradient annealing in which the inner surface of the tube is heated to a temperature higher than the recrystallization temperature thereof, while the outer surface of the tube is cooled, after the tube has been hot-extruded. The temperature-gradient annealing is effected while a temperature gradient is maintained between the inner surface and the outer surface of the cladding tube. While keeping the inner surface at a temperature higher than the recrystallization temperature, and the outer surface at a temperature lower than the recrystallization temperature. The cladding tube is obtained with the outer surface which has an excellent resistance to nodular corrosion and a soft inner surface which has an excellent resistance to stress corrosion cracking.

12 Claims, 12 Drawing Figures

METHOD OF PRODUCING A CLADDING TUBE FOR REACTOR FUEL

CROSS REFERENCE TO RELATED APPLICATION

This is a continuation-in-part of application Ser. No. 699,560, filed Feb. 8, 1985 now abandoned.

BACKGROUND OF THE INVENTION

The present invention relates to a method of producing a material for use in nuclear reactor environments and, in particular, to a method of producing a cladding, particularly a cladding tube, for nuclear reactor fuel. In particular, the present invention relates to a method of producing a cladding tube for nuclear fuel (that is, a tube for cladding the nuclear fuel) which is made of a zirconium alloy, and which is adapted for use in light-water reactors and heavy-water reactors of either the boiling water type or the pressurized water type.

Because of their excellent resistance to corrosion and very small neutron-absorbing sectional area, zirconium-based alloys have been used for making cladding tubes for holding fuel for nuclear plants, and for making fuel channel boxes.

These structures are irradiated with neutrons within reactors for extended periods of time, and also exposed to water or water vapor at high temperatures and high pressures, so that zirconium oxide films are formed on the surfaces thereof as corrosion proceeds. Spots of white oxide also form on the surfaces thereof. These spots of white oxide, called nodular corrosion, grow with the progress of corrosion reactions, and often peel off.

The outer surface of a cladding tube, in particular, is corroded by water or water vapor at high temperatures, so that the thickness of the tube is reduced by nodular corrosion, and its strength decreases.

In order to prevent abnormal nodular corrosion, studies have been conducted into methods of total $\beta$-quenching. It is known that, among the zirconium-based alloys, Zircaloy 2 (an alloy composed of zirconium containing about 1.5% tin, 0.1% iron, 0.1% chromium, and 0.05% nickel, all by weight) and Zircaloy 4 (an alloy composed of zirconium containing about 1.5% tin, 0.2% iron, and 0.1% chromium, all by weight) exhibit a markedly increased corrosion resistance if entire bodies made of them are heated quickly after a hot extrusion step, e.g., if both inner and outer surfaces of a cladding tube, for instance, are heated rapidly to the temperature region of the $(\alpha+\beta)$-phase or the $\beta$-phase, and if they are quickly quenched (hereinafter referred to as total $\beta$-quenching). (German Laid-Open Pat. No. 3,324,686).

A problem, however, occurs on the inner surface of a cladding tube for reactor fuel, as described below. The cladding fuel tube becomes brittle at an increased rate because of the interaction of the nuclear fuel and the products of nuclear fission, and also because of irradiation with neutrons, and hence tends to crack easily. This tendency is promoted by local mechanical stresses generated by differences in thermal expansion between the nuclear fuel and the cladding tube.

Stress corrosion cracking may develop on the inner surface of the cladding tube because of the presence of nuclear fission products such as iodine, cadmium, and the like that form during the operation of the nuclear reactor, and also because of simultaneous local stresses.

The inner surface of a cladding tube is also subject to the problem of stress corrosion cracking caused by gases (such as iodine) emitted by the combustion of the nuclear fuel making up the central core, and also by the expansion of the central core as it is sintered.

It is known to provide a layer of pure metal between the central core and the cladding tube in order to prevent the occurrence of stress corrosion cracking. In particular, a composite cladding tube has been proposed, in which the inner side of the cladding tube is lined with pure zirconium. (British Pat. No. 1,525,717).

The layer of pure zirconium has a thickness of 5 to 30% that of the cladding tube. Compared with a zirconium alloy, pure zirconium remains ductile during use, reduces local stresses that act on the cladding tube, and helps prevent the occurrence of stress corrosion cracking.

If the whole cladding tube is subjected to total $\beta$-quenching, however, the resistance to nodular corrosion increases on the outer surface of the cladding tube in contact with the reactor water, but the inner surface of the cladding tube tends to be susceptible to stress corrosion cracking. This is considered to be due to the fact that the dendritic structure formed by the total $\beta$-quenching is hard and has a low ductility. In addition, $\beta$-quenched materials tend to be more susceptible to stress corrosion cracking than ordinary annealed materials which are not subjected to $\beta$-quenching, even after cold-rolling and annealing.

If the whole composite cladding tube were subjected to total $\beta$-quenching in order to increase its resistance to stress corrosion cracking, the inner surface of the cladding tube being lined with pure zirconium, solute elements of the Zircaloy, such as tin, iron, chromium and oxygen, diffuse into the pure zirconium when heated to high temperatures, and the SCC resistance (resistance to stress corrosion cracking) decreases.

It is known to provide a nuclear fuel element having a zirconium alloy cladding tube with improved corrosion resistance. The cladding tube comprises a metallurgical gradient across the width of the tube wall wherein the tube has a more corrosion-resistant metallurgical condition at the outer circumference and a less corrosion resistant metallurgical condition at the inner circumference. The metallurgical gradient can be generated by heating an outer circumferential portion of the tube to the high $\alpha$ or mixed $(\alpha+\beta)$ range while maintaining the inner surface at a lower temperature followed by cooling of the tube. (hereinafter referred to as partial $\beta$-quenching) (U.S. Pat. No. 4,576,654).

In above U.S. patent, the technique of partial $\beta$-quenching is shown. Namely, the exterior of the tube shell within the induction coil was allowed to increase in temperature to about 1650° F. (900° C.), in about 22 seconds. The exterior temperature of the tube shell was held at about 1650° F. (900° C.), for about 8 seconds. The power was then cut off and the tube shell with water flowing through its interior was allowed to cool to about 400° F. (204° C.), in about 21 seconds.

The heat-treated tube shell was then reduced in a Pilger mill in three successive passes to a final cladding tube. After each reduction pass, the tube was annealed at about 1150° F. (621° C.), for about 2 hours.

In above U.S. patent, both of an outer surface and an inner surface of the cladding tube are held at same temperature, at above the recrystallization temperature (about above 830° C.).

As the outer surface of the cladding tube is quenched from a temperature above the recrystallization temperature, the processing structure does not remain at the outer surface. Therefore the corrosion resistance at the outer surface is lowered and the nodular corrosion at the outer surface can not be prevented.

Besides, the inner surface of the cladding tube is quenched also at above the recrystallization temperature. Since intergranular precipitations are caused as a whole at the inner surface, therefore the SCC resistance (resistance to stress corrosion cracking) decreases.

SUMMARY OF THE INVENTION

An object of the present invention is to provide a method of producing a cladding tube for reactor fuel wherein an excellent resistance to stress corrosion cracking at an inner surface of the cladding tube can be obtained.

Another object of the present invention is to provide a method of producing a cladding tube for reactor fuel wherein an occurrence of intergranular precipitations can be prevented as a whole at the inner surface of the cladding tube.

A further object of the present invention is to provide a method of producing a cladding tube for reactor fuel, wherein an excellent resistance to nodular corrosion at an outer surface of the cladding tube can be obtained.

According to a method of producing a cladding tube for reactor fuel according to the present invention, the inner side only of the cladding tube is heated and annealed while the outer surface thereof is cooled, in an annealing step after a hot extrusion step.

The temperature-gradient annealing of the present invention is performed by placing a heating member against the inner surface of the cladding tube, and by cooling the outer surface of the cladding tube with water, water vapor, gas, a salt bath or a metal mold providing cooling. The annealing should be effected while a temperature gradient is maintained between the inner surface and the outer surface of the cladding tube, i.e., while keeping the inner surface at a temperature higher than the recrystallization temperature, and the outer surface at a temperature lower than the recrystallization temperature.

By effecting the temperature-gradient annealing with this temperature difference, as described above, smaller quantities of precipitates form on the outer surface than on the inner surface. Thus it is possible to obtain a cladding tube with an outer surface which has an excellent resistance to nodular corrosion due to high-temperature, high-pressure water, and a soft inner surface which has an excellent resistance to stress corrosion cracking.

Since the temperature-gradient annealing can be effected at a temperature of less than 900° C., the inner surface can have a substantially completely recrystallized structure. Moreover, since the outer surface can be prevented from being heated, smaller quantities of precipitates form on the outer surface.

If the annealing temperature should exceed 900° C., the β-phase will appear, quenching will occur during cooling, and the material will be hardened, which is not desirable. A portion of up to one-third in thickness from the outer surface should be maintained at a temperature of less than 600° C.

The present invention, in particular, deals with a method of an article, such as a cladding tube for reactor fuel, which is made of a zirconium-based alloy, and in which smaller quantities of precipitates form on the outer surface of the cladding tube than on the inner surface thereof.

The method of the present invention is described in the following paragraphs in connection with an embodiment comprising a cladding tube. However, the method of the present invention is not limited to such embodiment, and can be utilized for other structure, to attain the objectives according to the method of the present invention.

The cladding tube for reactor fuel of this embodiment according to the method of the present invention, has an excellent resistance to nodular corrosion since the quantity of precipitates on the outer surface is less than that on the inner surface thereof, and also has an excellent resistance to stress corrosion cracking since its inner surface is ductile.

As an example, the method of the present invention is applicable to all zirconium-based alloys containing at least one of tin, iron and chromium, and is further applicable to Zr-2.5% Nb zirconium-based alloys. The zirconium-based alloy is preferably composed of 1 to 2% tin, 0.05 to 0.2% iron, 0.05 to 0.2% chromium, with either no nickel or 0.03 to 0.1% nickel, all by weight, the balance being substantially zirconium. The following chart shows exemplary compositions of the zirconium-based alloy. (wt %):

|  | Zircaloy 2 | Zircaloy 4 | Zr - 2.5% Nb |
|---|---|---|---|
| Sn | 1.20–1.70 | 1.20–1.70 | — |
| Fe | 0.07–0.20 | 0.18–0.24 | — |
| Cr | 0.05–0.15 | 0.07–0.13 | — |
| Nb | — | — | 2.40–2.80 |
| Ni | 0.03–0.08 | — | — |
| Fe + Cr + Ni | 0.18–0.38 | 0.28–0.37 | — |

N.B. Zircaloy 2 and Zircaloy 4 - ASTM standard.

For example, Zircaloy 2, Zircaloy 4, and Zr - 2.5% Nb zirconium-based alloy are used practically in nuclear reactor environments; Zircaloy 2 is used in boiling water reactors, Zircaloy 4 is used in pressurized water reactors, and Zr - 2.5% Nb zirconium-based alloy is used in pressure tubes for heavy-water reactors.

The cladding tube for reactor fuel according to the method of the present invention is made of a zirconium-based alloy, and the inner surface thereof may be provided with a metal barrier wall. For the metal barrier wall, pure zirconium or a zirconium alloy containing small amounts of iron and chromium (e.g., about 0.1 wt. % Fe and 0.1 wt. % Cr) but with no tin can be used, or copper, niobium, stainless steel, nickel, or aluminum can be used. The metal barrier wall should have a thickness 5 to 15% that of the cladding tube. In particular, it is desirable to use pure zirconium.

It is desirable to control the quantity of precipitates on the outer surface of the cladding tube so that, among the elements in the zirconium-based alloy for the cladding tube as a whole, the amount of solid solutions of iron, nickel and chromium (that is, the total amount of Fe, Ni and Cr in solid solution) is greater than 0.28%. Precipitates from the zirconium-based alloy are $ZrCr_2$, $Zr(Fe, Cr)_2$, $Zr(Fe, Ni)_2$, $Zr_2(Fe, Ni)$, etc.

The cladding tube is subjected to cold rolling and annealing at least once. However, the cold rolling and annealing should preferably be performed three times. The annealing temperature should preferably be less than 640° C., even more preferably, less than 600° C. The lower limit of this temperature should preferably be 500° C. The final annealing should be effected at a temperature lower than that of the intermediate annealing, and should preferably be effected at 400° to 610° C. The annealing should preferably be performed for less than 10 hours.

DETAILED DESCRIPTION OF THE INVENTION

Figure 1A:
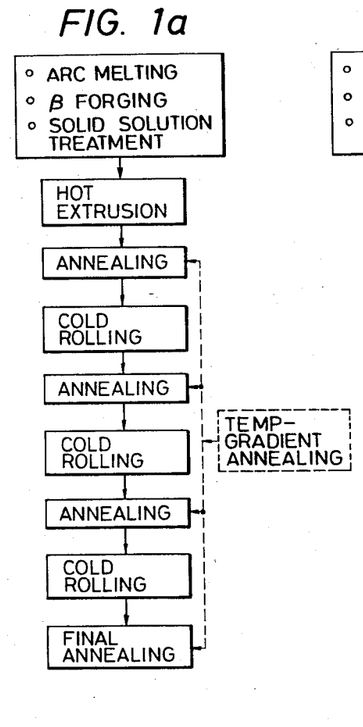
FIGS. 1a, 1b and 1c are block diagrams of the steps of producing a cladding tube for reactor fuel according to the method of the present invention.
Figure 1B:
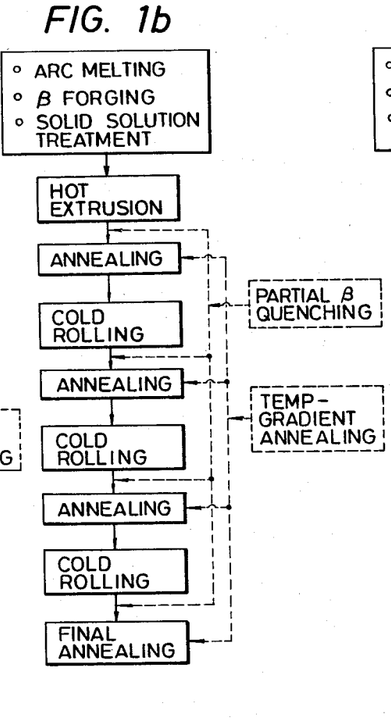
Figure 1C:
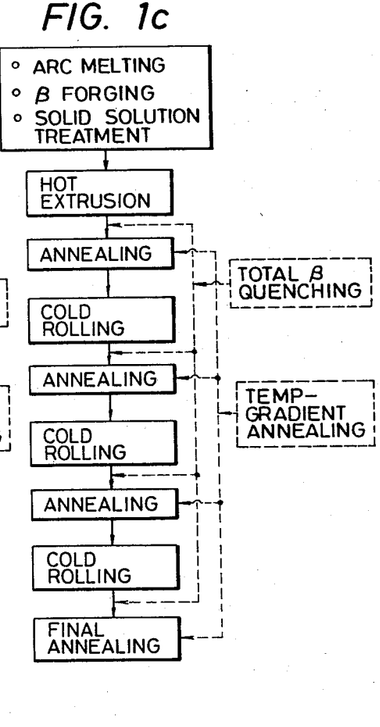

The block diagrams of FIGS. 1a, 1b and 1c illustrate the position at which temperature-gradient annealing is performed in the process of producing cladding tubes for reactor fuel according to the method of the present invention.

According to the present invention, temperature-gradient annealing is effected instead of the annealing of the conventional method, as shown in FIGS. 1a, 1b and 1c, and is effected at least once.

The partial $\beta$-quenching is effected at least once after hot extrusion but before annealing, or after cold rolling but before annealing, in a method in which annealing and cold rolling are repeated after hot extrusion has been finished.

The temperature-gradient annealing may be performed with the partial $\beta$-quenching from a temperature region including the $\beta$-phase, which may be effected at least once after hot extrusion but before annealing, or after cold rolling but before annealing, in a method in which annealing and cold rolling are repeated after hot extrusion has been finished in FIG. 1b. In particular, the partial $\beta$-partial quenching should be effected after hot extrusion, but before annealing.

The temperature-gradient annealing may be performed in combination with the conventional total $\beta$-quenching which is performed for the whole tube. FIG. 1c shows a production method based upon a combination of the total $\beta$-quenching of the whole tube and the temperature-gradient annealing of the present invention.

As mentioned above, the temperature-gradient annealing is effected at least once but, preferably, the partial $\beta$-quenching should be performed once immediately after the hot extrusion, and the cold rolling and annealing should each be effected three times.

The following description concerns a nuclear fuel element and a nuclear fuel aggregate in which the cladding tubes formed by the method of the present invention are employed.

Figure 2:
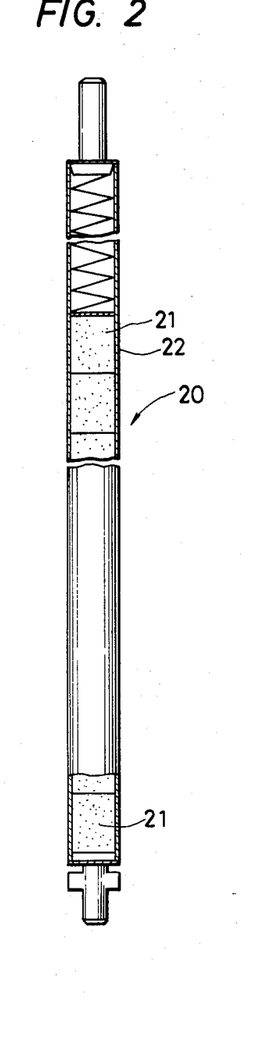
FIG. 2 is a partially-sectioned view of a nuclear fuel element using the cladding tube for reactor fuel according to the method of the present invention.

FIG. 2 is a partially-sectioned view of a nuclear fuel element employing the cladding tube formed by the method of the present invention. A central core 21 consisting of nuclear fuel elements 20 of a nuclear fuel material is held in a cladding tube 22. The central core 21 contains an uranium compound, a plutonium compound, or a mixture thereof. A small gap is provided between the cladding tube 22 and the central core 21.

Figure 3:
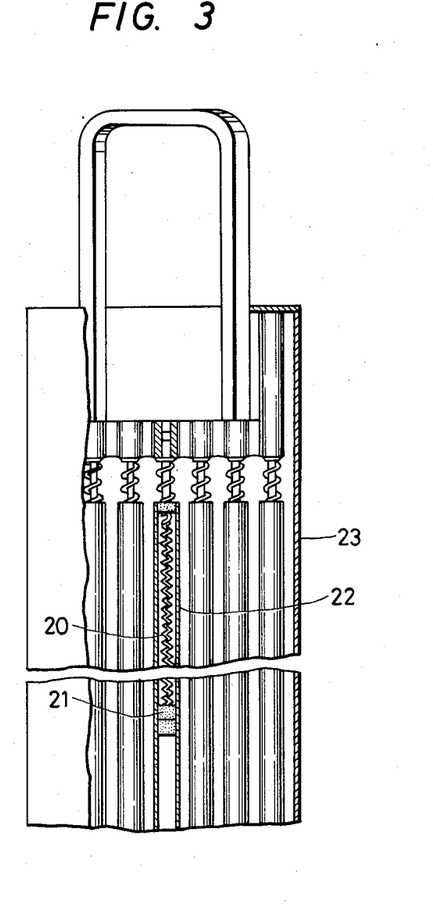
FIG. 3 is a partially-sectioned view of a nuclear fuel aggregate using cladding tubes for reactor fuel according to the method of the present invention.

FIG. 3 is a partially-sectioned view of a nuclear fuel aggregate according to the method of the present invention. Individual fuel elements 20 are held in channels 23 and are inserted into a nuclear reactor.

EXAMPLE 1

An ingot of Zircaloy 2 used consisted of 1.43% tin, 0.16% iron, 0.11% chromium, 0.06% nickel, all by weight, the balance being zirconium. This material was hot-extruded to produce a tube 63 mm in outer diameter, 10 mm thick, and 2500 mm long.

Both ends of the tube were sealed, and the tube was subjected to high-frequency partial $\beta$-quenching while the inner surface thereof was cooled with circulating water. The partial $\beta$-quenching was effected by securing a high-frequency oscillation coil, and moving the tube downward therethrough.

Figure 4:
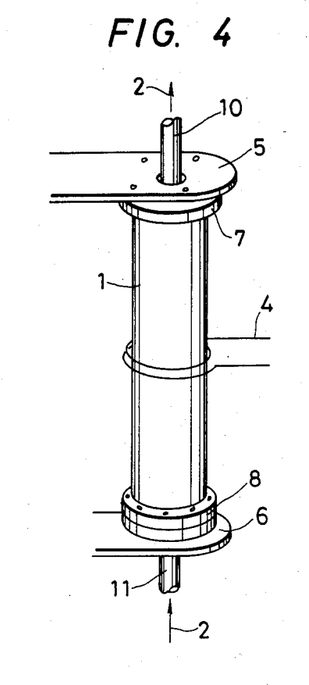
FIG. 4 is a diagram of the structure of an apparatus for realizing the partial $\beta$-quenching method.

FIG. 4 is a diagram of the structure of a partial $\beta$-quenching apparatus. Both ends of a tube 1 being produced are connected to water pipes 10, 11 by flanges 7, 8, and the inner surface of the tube 1 is constantly cooled by cooling water 2. On the other hand, the outer surface of the tube 1 is heated to a quenching temperature by a high-frequency oscillation coil 4. By moving upper and lower holder plates 5, 6 up and down, the tube 1 can be quenched over the full length thereof. Although water is used as a cooling medium herein, the predetermined temperature gradient can be obtained even when argon is introduced.

Figure 5:
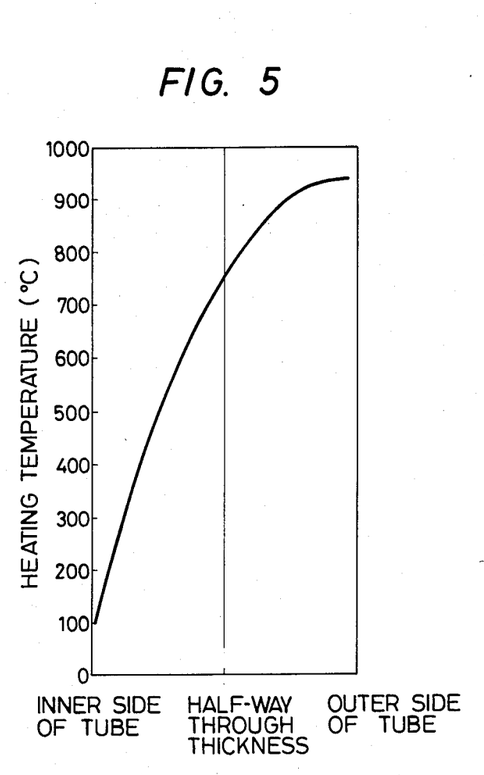
FIG. 5 is a graph of the distribution of heating temperature in a quenched tube.

FIG. 5 shows a temperature distribution when the temperature is raised during the partial $\beta$-quenching. This temperature distribution is that obtained when water is used as the cooling medium. In this case, the temperature of the inner surface of the tube 1 is less than 100° C. As mentioned above, however, this temperature may be raised to the upper limit of the $\alpha$-phase region. However, if the temperature exceeds 600° C., the precipitates become coarse, and resistance to nodular corrosion decreases. Therefore, the temperature of the inner surface of the tube 1 should be no higher than 600° C.

The outer surface of the tube 1 was heated to 960° C. for 20 to 30 seconds, and was then cooled to below 100° C. in less than one minute. The temperature on the inner surface of the tube 1 was raised to 100° C. at the most, for only a very short period of time.

Figure 6:
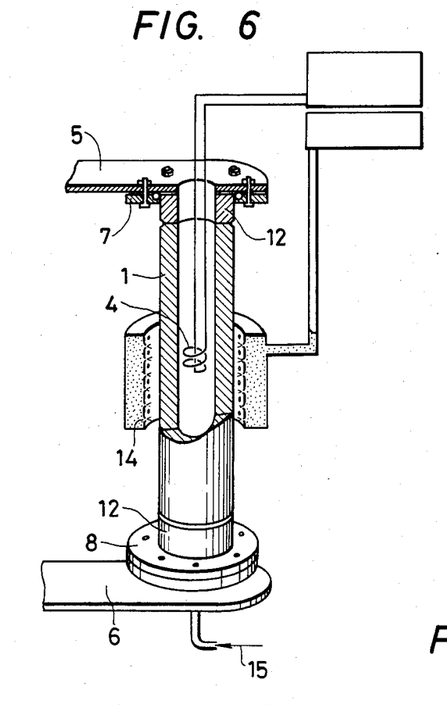
FIG. 6 is a partially-sectioned view of an apparatus for realizing the temperature-gradient annealing method of the present invention.

Thereafter, cold rolling was performed once at room temperature to provide a cross-section reduction ratio of 70%. After the cold rolling, the tube 1 was annealed using a temperature-gradient annealing apparatus as shown in FIG. 6. A high-frequency oscillation coil 4 was inserted in the tube 1 to heat the inside thereof, and the tube 1 was moved slowly in the lengthwise direction to provide the temperature-gradient annealing. At the same time, argon 15 was blown from cooling nozzles 14 onto the outer surface of the tube 1 to keep its temperature constantly low.

Figure 7:
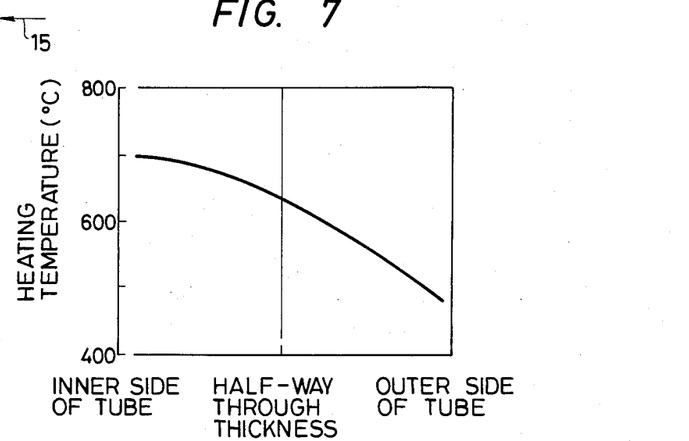
FIG. 7 is a graph of the distribution of heating temperature in a tube temperature-gradient annealed according to the method of the present invention.

In this case, the inner surface of the tube 1 was heated to about 700° C. for 5 minutes, and then the temperature was lowered to below 100° C. in less than 10 minutes. The outer surface of the tube 1, on the other hand, was heated to about 500°, lower than the above temperature of the inner surface which is about 700° C. The temperature gradient in this case is shown in FIG. 7.

During the temperature-gradient annealing, dummy tubes 12 were welded to both ends of the tube 1, and argon 15 was made to flow over the inner surface of the tube 1, in order to prevent oxidation.

Cold rolling was effected in the same manner as described above, annealing was effected at 600° C. for 2 hours, cold rolling was performed again in the same manner, and final annealing was effected at 577° C. for 3 hours.

The cladding tube according to this embodiment according to the method of the present invention had a partially recrystallized structure on the outer side, and a sufficiently softened recystallized structure on the inner side.

Figure 8:
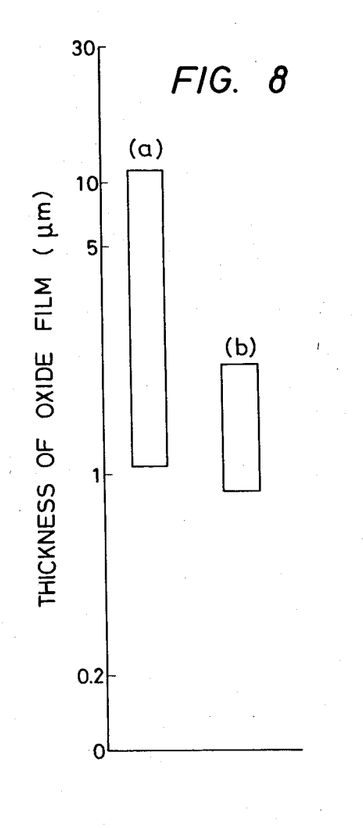
FIG. 8 is a graph of thicknesses of oxide film after testing using high-temperature, high-pressure water.

Corrosion tests and SCC (stress corrosion cracking) tests were performed in an iodine atmosphere on the cladding tubes. The corrosion tests were performed at 500° C. for 24 hours in water vapor, and the appearance of the test pieces was observed and the thickness of the oxide film measured. FIG. 8 shows the corrosion resistance of a conventional tube as shown in a diagram (a) and that of the tube of this embodiment according to the method of the present invention as shown in a diagram (b).

The conventional tube had not been quenched, but had been cold rolled three times, had been annealed at 650° C. for 2 hours, and had been finally annealed.

Nodular corrosion was observed in the conventional tube, and the thickness of the oxide film varied greatly, as shown in the diagram (a) of FIG. 8. On the other hand, no nodular corrosion was found on the tube of this embodiment according to the method of the present invention, and a uniform black oxide film was observed. With the tube of this embodiment according to the method of the present invention, the thickness of the film hardly varied as shown in the diagram (b) of FIG. 8 and this variation was close to the lower limit of the variation range of the conventional tube.

Figure 9:
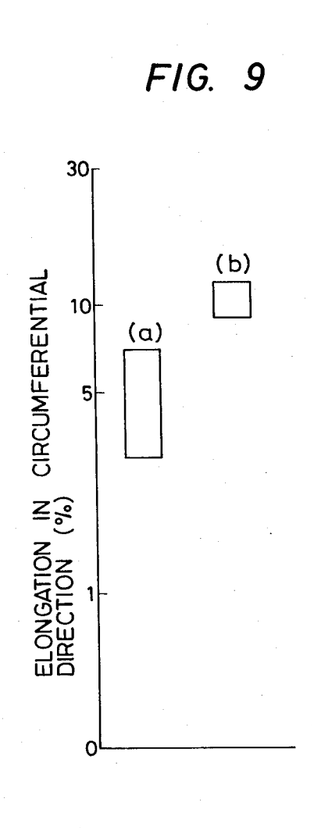
FIG. 9 is a graph of elongation percetages of cladding tubes.

FIG. 9 shows the results of SCC tests conducted in an iodine atmosphere. Elongation around the circumference was measured after stress corrosion cracking had developed under conditions of a test temperature of 350° C. and an iodine concentration of about 1 mg/cm$^2$ (with respect to the inner surface area of the cladding tube). As is obvious from FIG. 9, the circumferential elongation (b) of the tube of this embodiment according to the method of the present invention was larger than that (a) of the conventional tube, proving the excellent SCC resistance of the tube of this embodiment according to the method of the present invention.

Figure 10:
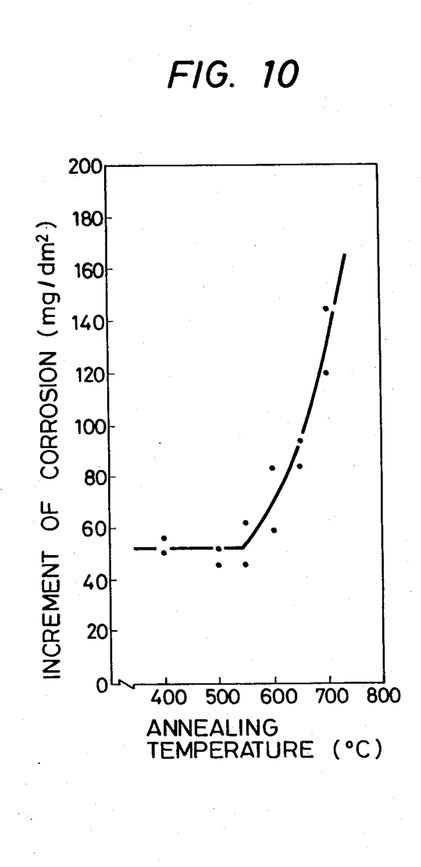
FIG. 10 is a graph of the relationship between annealing temperature and corrosion increment.

FIG. 10 is a graph of the relationship between annealing temperature and corrosion increment. The specimens were heated to 940° C. for 20 seconds, quenched by sprayed water, subjected to cold rolling at room temperature to obtain a cross-section reduction ratio of 70%, and were then annealed for 2 hours at various temperature.

The corrosion tests were performed at 500° C. for 24 hours in water vapor. It will be seen that corrosion increased as the annealing temperature exceeded 600° C. Recrystallization took place at temperatures above about 500° C., although this varied depending upon the degree of processing. To obtain an excellent nodular corrosion resistance, it will be understood that the annealing temperature of the outer surface which comes into contact with high-temperature, high-pressure water in the nuclear reactor should not exceed 600° C.

EXAMPLE 2

The material used was a hot-extruded tube the same as that employed in Example 1. Total $\beta$-quenching was effected for the whole tube. The tube was heated to 1000° C. for 20 seconds, and was then cooled to room temperature in less than a minute. The tube was then subjected to a first cold rolling step at room temperature, and was then temperature-gradient annealed in accordance with the present invention.

The temperature-gradient annealing apparatus of FIG. 6 was used. The whole tube was temperature-gradient annealed by inserting the high-frequency oscillation coil 4 in the tube 1 to heat the inner surface thereof, and spraying water from the cooling nozzles 14 onto the outer surface thereof, while moving the tube 1 in the lengthwise direction. The temperature was 800° C. on the inner surface, this temperature being maintained for 5 minutes, and was 650° C. on the outer surface thereof. Thereafter, cold rolling and annealing under conditions of 600° C. for 2 hours were effected twice to obtain a cladding tube. The annealing was effected for the whole tube. The second and third cold rolling and annealing steps were the same as those of Example 1.

Test pieces were cut from cladding tubes and were tested with respect to nodular corrosion resistance and SCC resistance in iodine. Table 1 shows the results of these tests. As comparative examples, results of a conventional tube which had not been quenched, and of a conventional tube which had been completely total $\beta$-quenched, are also tabulated. The conventional tubes were produced by the method of producing conventional tubes quoted in Example 1. As is obvious from the test results, the tubes of embodiments applying the method of the present invention exhibit an excellent resistance to nodular corrosion and an excellent SCC resistance in iodine.

TABLE 1

| Cladding tubes | Features | Susceptibility to nodular corrosion 500° C., in water vapor at 105 kg/cm$^2$ for 50 hours | SSC tests in iodine 350° C., low-speed compression test in iodine |
| --- | --- | --- | --- |
| Tubes of embodiments of the present invention | Partial $\beta$-quenching plus temperature gradient annealing | No nodular corrosion | Circumferential elongation larger than 10% |
| | Total $\beta$-quenching plus temperature-gradient annealing | No nodular corrosion | Circumferential elongation larger than 10% |

TABLE 1-continued

| Cladding tubes | Features | Susceptibility to nodular corrosion 500° C., in water vapor at 105 kg/cm² for 50 hours | SSC tests in iodine 350° C., low-speed compression test in iodine |
|---|---|---|---|
| Conventional tubes | No quenching | Conspicuous nodular corrosion | Circumferential elongation 7% |
| | Total β-quenched tube | No nodular corrosion | Circumferential elongation 3% |

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

What is claimed is:

1. A method of producing a cladding tube for reactor fuel comprising hot-extruding a zirconium-based alloy to form a hot-extruded tube and effecting cold rolling and annealing at least once, wherein said annealing is effected at least once by heating the inner surface of said cladding tube to a temperature higher than the recrystallization temperature of said zirconium-based alloy, while cooling the outer surface of said cladding tube.

2. A method of producing a cladding tube for reactor fuel according to claim 1, wherein the outer surface of said cladding tube is cooled to a temperature lower than the recrystallization temperature of said zirconium-based alloy.

3. A method of producing a cladding tube for reactor fuel comprising hot-extruding a zirconium-based alloy, to form a hot-extruded tube, heating the hot-extruded tube to a temperature region that includes the β-phase of said zirconium-based alloy followed by quenching, and effecting both cold rolling and annealing at least once, wherein said heating the hot-extruded tube to a temperature region that includes the β-phase is effected by heating the outer surface of said cladding tube to a temperature region that includes said β-phase followed by quenching, while cooling the inner surface of said cladding tube, and wherein said annealing is effected at least once by heating the inner surface of said cladding tube to a temperature higher than the recrystallization temperature of said zirconium-based alloy, while cooling the outer surface of said cladding tube.

4. A method of producing a cladding tube for reactor fuel according to claim 3, wherein the outer surface of said cladding tube is cooled during the annealing to a temperature lower than the recrystallization temperature of said zirconium-based alloy.

5. A method of producing a cladding tube for reactor fuel comprising hot-extruding a zirconium-based alloy, to form a hot-extruded tube, heating all of the hot-extruded tube at least once to a temperature region that includes the β-phase of said zirconium-based alloy, followed by quenching, and effecting both cold rolling and annealing at least once, wherein said annealing is effected at least once by heating the inner surface of said cladding tube to a temperature higher than the recrystallization temperature of said zirconium-based alloy, while cooling the outer surface of said cladding tube.

6. A method of producing a cladding tube for reactor fuel comprising hot-extruding a zirconium-based alloy, to form a hot-extruded tube, heating the hot-extruded tube to a temperature region that includes the β-phase of said zirconium-based alloy followed by quenching, and effecting both cold rolling and annealing at least once, wherein in heating the hot-extruded tube the outer surface of said cladding tube is heated to a temperature region that includes said β-phase and is quenched while the inner surface of said cladding tube is cooled, and wherein said annealing is effected at least once by heating the inner surface of said cladding tube to a temperature higher than the recrystallization temperature of said zirconium-based alloy, while cooling the outer surface of said cladding tube.

7. A method of producing a cladding tube for reactor fuel according to claim 1, wherein an inner side of said cladding tube is lined with metal barrier wall.

8. A method of producing a cladding tube for reactor fuel according to claim 1, wherein the temperature of the inner surface of the cladding tube during said heating is less than 900° C.

9. A method of producing a cladding tube for reactor fuel according to claim 1, wherein the outer surface is cooled so as to maintain a portion up to ⅓ of the cladding tube thickness, from the outer surface of the cladding tube, at a temperature of less than 600° C.

10. Product formed by the process of claim 1.

11. Product formed by the process of claim 3.

12. Product formed by the process of claim 5.

* * * * *